(12) United States Patent
Iso et al.

(10) Patent No.: US 7,933,234 B2
(45) Date of Patent: Apr. 26, 2011

(54) GUIDE APPARATUS, GUIDE SYSTEM, AND GUIDE METHOD

(75) Inventors: Toshiki Iso, Yokosuka (JP); Kiyotaka Otsuji, Kamakura (JP); Hiroki Suzuki, Yokohama (JP); Shoji Kurakake, Yokohama (JP); Toshiaki Sugimura, Yokohama (JP); Hidenori Shimizu, Hachioji (JP); Taro Sugahara, Tokyo (JP); Fumitoshi Ukai, Tokyo (JP); Hironori Bouno, Tokyo (JP); Marc McEachern, Tokyo (JP); Shinya Nakagawa, Mitaka (JP)

(73) Assignees: NTT DoCoMo, Inc., Tokyo (JP); Hewlett-Packard Company, Palo Alto, CA (US)

( * ) Notice: Subject to any disclaimer, the term of this patent is extended or adjusted under 35 U.S.C. 154(b) by 1470 days.

(21) Appl. No.: 10/891,018

(22) Filed: Jul. 15, 2004

(65) Prior Publication Data
US 2005/0026630 A1 Feb. 3, 2005

(30) Foreign Application Priority Data
Jul. 17, 2003 (JP) .................................. 2003-198620

(51) Int. Cl.
*H04W 4/00* (2009.01)
(52) U.S. Cl. ..................................... 370/328; 455/456.1
(58) Field of Classification Search .................. 370/218, 370/235, 412, 216, 220, 338; 340/539, 988; 705/26; 348/211, 207; 455/456, 456.1, 457; 235/382; 382/115; 707/3; 342/451
See application file for complete search history.

(56) References Cited

U.S. PATENT DOCUMENTS

| | | | |
|---|---|---|---|
| 6,336,073 B1 | 1/2002 | Ihara et al. | |
| 6,570,845 B1 * | 5/2003 | Blanc et al. | 370/218 |
| 7,066,387 B2 * | 6/2006 | Itoh et al. | 235/382 |
| 7,289,812 B1 * | 10/2007 | Roberts et al. | 455/456.1 |
| 7,376,640 B1 * | 5/2008 | Anderson et al. | 707/3 |
| RE41,174 E * | 3/2010 | Kitano et al. | 340/988 |

(Continued)

FOREIGN PATENT DOCUMENTS

| | | |
|---|---|---|
| JP | 11-312190 | 11/1999 |
| JP | 2001-265997 | 9/2001 |
| JP | 2001-266090 | 9/2001 |
| JP | 2002-48586 | 2/2002 |

(Continued)

OTHER PUBLICATIONS

Tsukasa Ogino, "Strategy and perspective of Wireless IC tag Application", RF ID+Networking,Ipv6 magazine No. 5, Spring 2003, vol. 5, May 18, 2003, pp. 1-16.

*Primary Examiner* — Kwang B Yao
*Assistant Examiner* — Syed M Bokhari
(74) *Attorney, Agent, or Firm* — Oblon, Spivak, McClelland, Maier & Neustadt, L.L.P.

(57) ABSTRACT

A guide apparatus 50 according to the present invention is provided with a service information DB 30*d* storing service information containing a service providing place and attribute information of a target user; a recognizing device 30*b* for acquiring an ID from image data transmitted from a cell phone 14; a retrieving device 30*c* for retrieving service information from the service information DB 30*d* on the basis of the acquired ID and for retrieving such service information that attribute information of the user of cell phone 14 coincides with attribute information of a target user, out of service information provided at service providing places near the service providing place; and a route retrieving device 20*c* for retrieving a route between the information about the service providing place retrieved and the cell phone 14; and transmits the route information and service information as guide information to the cell phone 14.

16 Claims, 9 Drawing Sheets

U.S. PATENT DOCUMENTS

| | | | |
|---|---|---|---|
| 2001/0034660 A1* | 10/2001 | Heumann | 705/26 |
| 2003/0014321 A1* | 1/2003 | Stern et al. | 705/26 |
| 2003/0123710 A1* | 7/2003 | Nakazawa et al. | 382/115 |
| 2003/0185191 A1* | 10/2003 | Nagatomo et al. | 370/338 |
| 2003/0202104 A1* | 10/2003 | Werner | 348/207.99 |
| 2004/0073646 A1 | 4/2004 | Cho et al. | |
| 2004/0140931 A1* | 7/2004 | Vesuna | 342/451 |
| 2004/0201709 A1* | 10/2004 | McIntyre et al. | 348/211.2 |
| 2004/0203909 A1* | 10/2004 | Koster | 455/456.1 |
| 2006/0220838 A1* | 10/2006 | Wakim et al. | 340/539.12 |
| 2008/0268876 A1* | 10/2008 | Gelfand et al. | 455/457 |

FOREIGN PATENT DOCUMENTS

| | | |
|---|---|---|
| JP | 2002-073668 | 3/2002 |
| JP | 2002-181581 | 6/2002 |
| JP | 2003-67289 | 3/2003 |
| JP | 2003-185455 | 7/2003 |
| KR | 20-0226180 | 6/2001 |
| KR | 2002-0028067 | 4/2002 |
| KR | 2002-0050670 | 6/2002 |
| WO | WO 01/46781 A2 | 6/2001 |

* cited by examiner

*Fig.4*

| GLOBAL ID | NAME | RELATED INFORMATION | TARGET USERS |
|---|---|---|---|
| G1001 | SHOP A | PET SHOP<br>CLOSED ON SATURDAYS AND SUNDAYS<br>BUSINESS HOURS10:00~19:00<br>... TOSHIMA-KU, TOKYO | 20'S-50'S<br>WOMEN |
| G1002 | SHOP B | BICYCLE SHOP<br>CLOSED ON SUNDAYS<br>BUSINESS HOURS10:00~20:00<br>... SHINJUKU-KU, TOKYO | 20'S-30'S<br>MEN |
| ⋮ | ⋮ | ⋮ | |

| CELL PHONE NUMBER | ATTRIBUTE INFORMATION |
|---|---|
| 090-1234-⋯ | WOMAN IN 20'S |
| 090-5678-⋯ | MAN IN 30'S |
| ⋮ | ⋮ |

| IDENTIFICATION INFORMATION | DISPLAY PLACE |
|---|---|
| 1001−01 | ... CHUO-KU, TOKYO |
| 1001−02 | ... MINATO-KU, TOKYO |
| . | . |
| . | . |
| . | . |
| 1002−01 | ... SAITAMA-SHI, SAITAMA |
| 1002−02 | ... KITA-KU, TOKYO |
| . | . |
| . | . |
| . | . |

30g

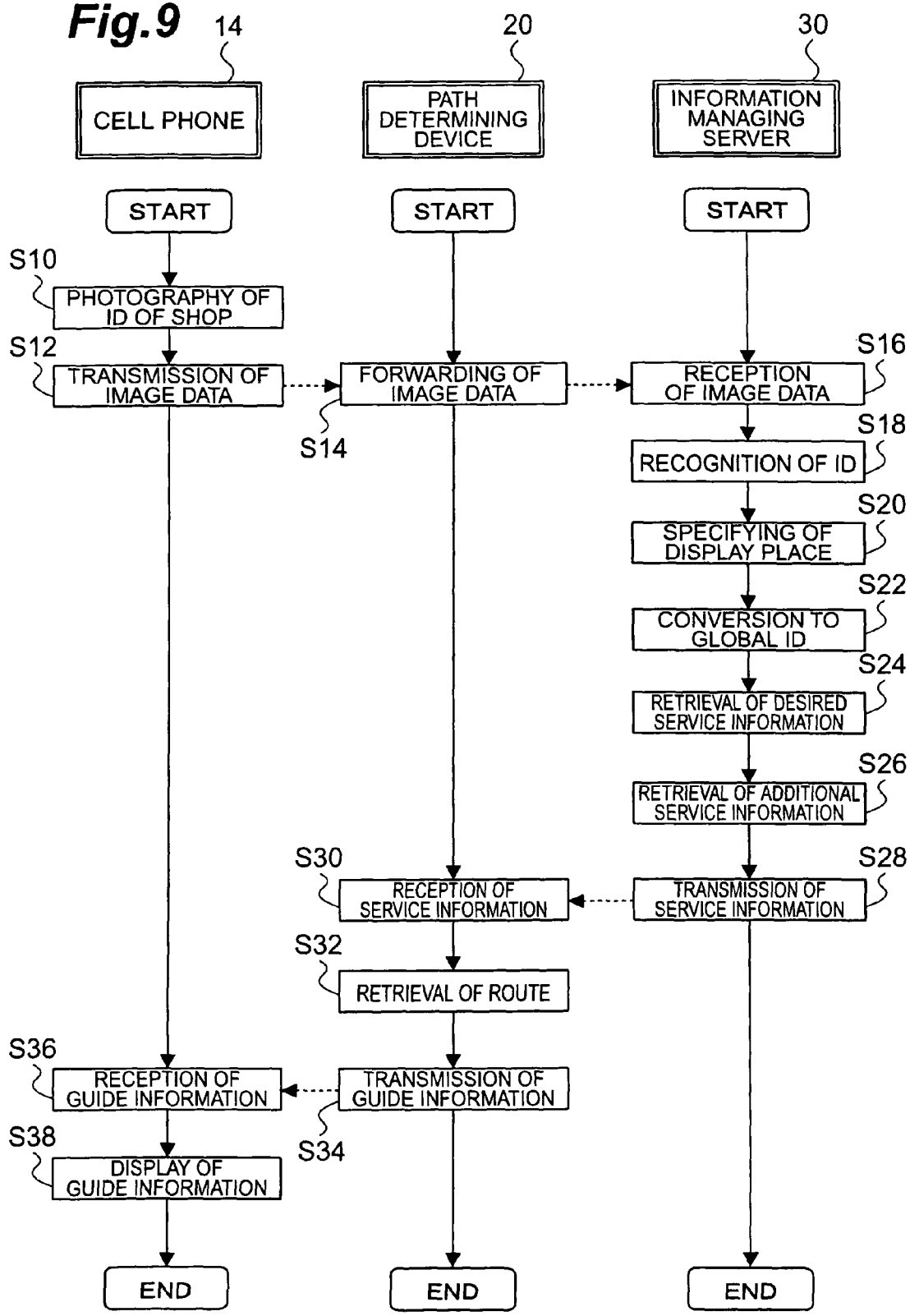

GUIDE APPARATUS, GUIDE SYSTEM, AND GUIDE METHOD

BACKGROUND OF THE INVENTION

1. Field of the Invention

The present invention relates to a guide apparatus, a guide system, and a guide method for guiding users to such service providing places as stores and, more particularly, to a guide apparatus, a guide system, and a guide method for providing a location of a store or the like, directions to a store or the like, and related information to a store or the like, for a user.

2. Related Background Art

There are conventionally known navigation systems for navigating to a location where a target object (a store or the like) under an advertisement on a magazine is located, as described in Patent Document 1. This Patent Document 1 discloses a scheme of providing an advertisement of each commercial product with a bar code. A user scans this bar code to take it into a navigation device. Then the navigation device searches for a path between a host vehicle and a target object (a store or the like) under the advertisement, based on the location of the host car and the location of the target object, and executes a navigation operation. It is described that the user can go to the target object (a store or an apartment) under the advertisement or the like. Furthermore, Patent Document 2 discloses an advertisement to provide detailed information of a commercial product. According to this Patent Document 2, an IC retaining an identifier of a commercial product is buried in an advertisement of the commercial product, and a user reads this identifier from the IC and transmits it to a service provider. The service provider acquires detailed information of the commercial product, based on the identifier, and transmits the detailed information to the user. This permits the user to know the detailed information of the commercial product.

[Patent Document 1] Japanese Patent Application Laid-Open No. JP-A-2002-181581

[Patent Document 2] Japanese Patent Application Laid-Open No. JP-A-2001-266090

SUMMARY OF THE INVENTION

According to the invention disclosed in above Patent Document 1, the user can receive the navigation (path guide) service to the location of the target object under the advertisement, but it requires the navigation device, which tends to become large in scale. The invention disclosed in Patent Document 2 achieved the navigation and the advertisement of the target object, but failed to implement provision of information of other services.

The invention disclosed in above Patent Document 2 can provide the user with an advertisement providing detailed information of a commercial product, but fails to provide the user with detailed information of a store, particularly, directions or the like.

The present invention has been accomplished to solve the above problems and it is, therefore, an object of the present invention to provide a guide apparatus, a guide system, and a guide method capable of providing a user with guide information to a store or the like as a service providing place and also providing the user with additional service information near the service providing place.

A guide apparatus according to the present invention is a guide apparatus for transmitting guide information for guiding a user of a portable terminal to a service providing place, to the portable terminal, the guide apparatus comprising: service information storing means storing service information comprising information about a service providing place for a service and attribute information of a target user for the service; receiving means for receiving data containing identification information to identify a service providing place, which is transmitted from the portable terminal; identification information acquiring means for acquiring the identification information of the service providing place included in the data received by the receiving means; first retrieving means for retrieving service information from the service information storing means, based on the identification information acquired by the identification information acquiring means; second retrieving means for, based on information about the service providing place included in the service information retrieved by the first retrieving means, retrieving service information of a service provided at another service providing place near the service providing place and for retrieving from the retrieved service information, such service information that attribute information of a target user for a service thereof coincides with attribute information of the user of the portable terminal; route retrieving means for retrieving a route between the portable terminal and the service providing place, based on the information about the service providing place included in the service information retrieved by the first retrieving means; and transmitting means for transmitting to the portable terminal, information about the route retrieved by the route retrieving means and the service information retrieved by the second retrieving means, as guide information.

The guide apparatus according to the present invention has the service information storing means storing the attribute information of a user as a target for a service provided at a service providing place (a target user). This permits the first retrieving means to retrieve the service information associated with the identification information, based on the identification information included in the data transmitted from the portable terminal and permits the second retrieving means to select a service suitable for the user, from services provided near the service providing place as a destination. According to the present invention, the guide apparatus can provide the user with service information offering a service suitable for the user, near the service providing place as a destination, which is convenient. Here whether another service providing place is located near the destination service providing place can be determined by whether a distance between the other service providing place and the destination service providing place is within a range of a predetermined threshold. This threshold can be changed according to transportation means, e.g., a small threshold for a walking user, a large threshold for a user on a car, and so on. The "service providing place" embraces any spot that people visit, and is independent of whether a service is provided with or without a consideration. For example, it refers to a store, an amusement park, a park, a tourist spot, a station, or the like. In this example, the store provides services of sales of goods, the amusement park, park, tourist spot, etc. those of leisure, and the station those of transportation.

The above guide apparatus is preferably configured so that the receiving means receives image data containing identification information to identify a service providing place, which is transmitted from the portable terminal, and so that the identification information acquiring means analyzes the image data received by the receiving means, to acquire the identification information of the service providing place included in the image data.

Since the apparatus is configured to analyze the image data transmitted from the portable terminal to acquire the identification information included in the image data and retrieve the service information on the basis of this identification information, the user can readily obtain the guide information by merely photographing the identification information by the portable terminal and transmitting it.

The above guide apparatus may be configured so that the receiving means further receives information about a location of the portable terminal, and so that the route retrieving means retrieves the route on the basis of the location information of the portable terminal received by the receiving means and the information about the service providing place.

By acquiring the location information of the portable terminal from the portable terminal in this manner, the route retrieving means can retrieve the route on the basis of the location information and the information of the service providing place.

The above guide apparatus may be configured to further comprise identification information display place information storing means storing information about a display place of the identification information, and so that the route retrieving means acquires the information about the display place of the identification information from the identification information display place storing means on the basis of the identification information acquired by the identification information acquiring means, and retrieves the route on the basis of the display place of the acquired identification information and the information about the service providing place.

When the apparatus comprises the identification information display place information storing means storing the information about the display place of the identification information in this manner, the route retrieving means can retrieve the route between the display place of the identification information and the service providing place and thus provide the information about the route even for a portable terminal from which the location information cannot be acquired.

The above guide apparatus may be configured so that the receiving means further receives the attribute information of the user of the portable terminal, and so that, based on the attribute information of the user received by the receiving means, the second retrieving means retrieves such service information that the attribute information of the user coincides with attribute information of a target user for a service.

When the apparatus is configured to receive the attribute information of the user transmitted from the portable terminal and retrieve such service information that the attribute information of the user coincides with the attribute information of the target user in this manner, the apparatus can retrieve the service information suitable for the user.

The above guide apparatus may be configured to further comprise user information storing means storing the attribute information of the user of the portable terminal, and configured so that the receiving means further receives identification information of the portable terminal, and so that the second retrieving means retrieves the attribute information of the user of the portable terminal from the user information storing means, based on the identification information of the portable terminal received by the receiving means, and retrieves such service information that the attribute information of the user coincides with attribute information of a target user for a service, based on the retrieved attribute information.

By adopting the configuration comprising the user information storing means storing the attribute information of the user in this manner, the apparatus can retrieve the attribute information of the user of the portable terminal on the basis of the identification information of the portable terminal transmitted from the portable terminal and retrieve such service information that the attribute information of the user coincides with the attribute information of the target user, thereby retrieving the service information suitable for the user.

The above guide apparatus may be configured so that the service information storing means stores the service information in connection with global identification information unitarily assigned to service groups of different kinds, so that it further comprises converting means for converting the identification information acquired by the identification information acquiring means, to global identification information, and so that the first retrieving means retrieves the service information from the service information storing means, using the global identification information obtained through the conversion by the converting means.

According to the present invention, the service information storing means stores the service information in connection with the global identification information as described above, and it is thus feasible to unitarily handle various stores, amusement parks, parks, and so on. Here the "global identification information" refers to identification information for unitarily handling various identification information items commonly used in the world.

The above guide apparatus may be configured so that it is comprised of a path determining device having the receiving means, the route retrieving means, and the transmitting means; and an information managing device having the service information storing means, the first retrieving means, and the second retrieving means, and so that each of the path determining device and the information managing device comprises communication means for transmitting and receiving data which was transmitted from the portable terminal and which the path determining means received by the receiving means, and service information which the information managing device retrieved from the service information storing means.

When the apparatus is comprised of the separate devices: the path determining device having the receiving means, the route retrieving means, and the transmitting means; and the information managing device having the service information storing means, the first retrieving means, and the second retrieving means in a configuration wherein the devices are connected through a network, it is feasible to prevent intensive access to the guide apparatus and thereby increase efficiency. Namely, the information managing device integrally manages the service information, a number of path determining devices accept access from portable terminals, and each path determining device accesses the information managing device to acquire necessary information and create guide information, whereby loads are scattered among the devices so as to increase efficiency of processing in the guide apparatus.

The above guide apparatus may be configured so that the guide information transmitted by the transmitting means is map information.

When the guide information is displayed in the form of the map information, the guide information becomes easier for the user to understand.

The above guide apparatus may be configured so that the identification information is displayed in the form of a mark of a two-dimensional bar code.

This configuration is preferable because many types of identification information items can be readily handled by two-dimensional bar codes.

The above guide apparatus may be configured so that the service providing place is a shopping mall.

The service providing place may be not only a sole store, but also a shopping mall.

A guide system according to the present invention is a guide system comprising the guide apparatus as set forth, a portable terminal wirelessly communicable with the guide apparatus, and a display of identification information of the service providing place located at a place different from the service providing place, wherein the portable terminal comprises: photographing means for photographing the display of the identification information, communication means for transmitting image data obtained through photography by the photographing means, to the guide apparatus and for receiving guide information transmitted from the guide apparatus, and display means for displaying the guide information received by the communication means.

When the guide system according to the present invention is provided with the aforementioned guide apparatus, it can select a service suitable for the user, from services near the service providing place identified by the identification information. This permits the user to acquire the service information offering the service suitable for the user near the service providing place as a destination, which is convenient. Since the guide system comprises the guide apparatus configured to analyze the image data transmitted from the portable terminal, to acquire the identification information included in the image data and retrieve the service information on the basis of the identification information, the user can easily obtain the guide information by merely photographing the identification information by the portable terminal and transmitting it.

The above guide system may be configured so that the communication means further transmits information about a location of the portable terminal to the guide apparatus.

When the location information is transmitted from the portable terminal in this manner, the route retrieving means of the guide apparatus can retrieve the route on the basis of the location information and the information of the service providing place.

The above guide system may be configured so that the communication means further transmits identification information of the portable terminal or attribute information of the user to the guide apparatus.

When the portable terminal transmits the identification information of the portable terminal or the attribute information of the user in this manner, it is feasible to retrieve such service information that the attribute information of the user coincides with the attribute information of the target user for the service and to retrieve service information suitable for the user.

The above guide system may be configured so that the portable terminal is a cell phone.

Since the cell phones with photographing means are well known at present, use of such cell phones is preferable because the guide system can be easily constructed.

A guide method according to the present invention is a guide method in a guide system comprising a guide apparatus having service information storing means which stores service information comprising information about a service providing place for a service and attribute information of a target user for the service; a portable terminal wirelessly connected to the guide apparatus; and a display of identification information of the service providing place located at a place different from the service providing place, the guide method being adapted to transmit to the portable terminal, guide information for guiding a user of the portable terminal to the service providing place, the guide method comprising: a photographing step of photographing the display of the identification information by the portable terminal; an image data transmitting step of transmitting image data obtained through photography in the photographing step, from the portable terminal and letting the guide apparatus receive the image data; an identification information acquiring step wherein the guide apparatus analyzes the image data received in the image data transmitting step and acquires the identification information of the service providing place included in the image data; a first retrieving step wherein the guide apparatus retrieves service information from the service information storing means, based on the identification information acquired in the identification information acquiring step; a second retrieving step wherein, based on information about the service providing place included in the service information retrieved in the first retrieving step, the guide apparatus retrieves service information of a service provided at another service providing place near the service providing place and retrieve from the retrieved service information, such service information that attribute information of a target user for a service thereof coincides with attribute information of the user of the portable terminal; a route retrieving step wherein the guide apparatus retrieves a route between the portable terminal and the service providing place, based on the information about the service providing place included in the service information retrieved in the first retrieving step; and a guide information transmitting step wherein the guide apparatus transmits information about the route retrieved in the route retrieving step and the service information retrieved in the second retrieving step, as guide information and wherein the portable terminal is made to receive the guide information.

In the guide method according to the present invention, the attribute information of a user as a target for a service provided at a service providing place (a target user) is stored in the service information storing means, the service information associated with the identification information is retrieved based on the identification information included in the image data transmitted from the portable terminal in the first retrieving step, and a service suitable for the user is selected from services provided near the service providing place as a destination in the second retrieving step. This makes it feasible to provide the user with the service information offering the service suitable for the user near the service providing place as a destination, which is convenient. Here whether another service providing place is located near the destination service providing place can be determined by whether a distance between the other service providing place and the destination service providing place is within a range of a predetermined threshold. This threshold can be changed according to transportation means, e.g., a small threshold for a walking user, a large threshold for a user on a car, and so on. In the guide method according to the present invention, the image data transmitted from the portable terminal is analyzed to acquire the identification information included in the image data and the service information is retrieved based on the identification information; therefore, the user can easily obtain the guide information by merely photographing the identification information by the portable terminal and transmitting it.

The above guide method may be configured so that in the image data transmitting step, information about a location of the portable terminal is further transmitted from the portable terminal and the guide apparatus is made to receive the information and so that in the route retrieving step a route is retrieved based on the location information of the portable terminal received in the image data transmitting step and the information about the service providing place.

Since in the image data transmitting step the portable terminal transmits the location information of the portable terminal to the guide apparatus in this manner, the route can be retrieved on the basis of the location information and the information of the service providing place in the route retrieving step.

The above guide method may be configured so that the guide apparatus further stores information about a display place of the identification information in identification information display place information storing means and so that in the route retrieving step, the information about the display place of the identification information is acquired from the identification information display place storing means, based on the identification information acquired in the identification information acquiring step and the route is retrieved based on the display place of the identification information acquired and the information about the service providing place.

By this configuration of storing the information about the display place of the identification information in the identification information display place information storing means, and retrieving the route between the display place of the identification information and the service providing place in the route retrieving step, it is feasible to provide the information about the route even for a portable terminal from which the location information cannot be acquired.

The above guide method may be configured so that in the image data transmitting step, attribute information of the user of the portable terminal is further transmitted from the portable terminal and the guide apparatus is made to receive the attribute information and so that in the second retrieving step, such service information that the attribute information of the user coincides with attribute information of a target user for a service is retrieved based on the attribute information of the user received by the guide apparatus in the image data transmitting step.

By this configuration of transmitting the attribute information of the user from the portable terminal to the guide apparatus in the image transmitting step, it is feasible in the second retrieving step to retrieve such information that the attribute information of the user transmitted coincides with attribute information of a target user and to retrieve service information suitable for the user.

The above guide method may be configured so that the guide apparatus further stores attribute information of the user of the portable terminal in user information storing means, so that in the image data transmitting step, identification information of the portable terminal is further transmitted from the portable terminal and the guide apparatus is made to receive the identification information, and so that in the second retrieving step, the attribute information of the user of the portable terminal is retrieved from the user information storing means, based on the identification information of the portable terminal received by the guide apparatus in the image data transmitting step, and such service information that the attribute information of the user coincides with attribute information of a target user for a service, is retrieved based on the retrieved attribute information.

By this configuration of storing the attribute information of the user in the user information storing means, and transmitting the identification information of the portable terminal from the portable terminal to the guide apparatus in the image data transmitting step, it is feasible in the second retrieving step to retrieve the attribute information of the user of the portable terminal on the basis of the transmitted identification information, to retrieve such service information that the attribute information of the user coincides with attribute information of a target user, and thereby to retrieve service information suitable for the user.

The above guide method may be configured so that the service information storing means stores the service information in connection with global identification information unitarily assigned to service groups of different types, so that the method further comprises a converting step of converting the identification information acquired in the identification information acquiring step, to global identification information, and so that in the first retrieving step the service information is retrieved from the service information storing means, using the global identification information obtained through the conversion in the converting step.

According to the present invention, the service information is stored in connection with the global identification information, whereby it is feasible to unitarily handle various stores, amusement parks, parks, and so on. Here the "global identification information" refers to identification information for unitarily handling various identification information items commonly used in the world.

The above guide method may be configured so that the guide information transmitted in the guide information transmitting step is map information.

When the guide information is displayed in the form of the map information, the guide information becomes easier for the user to understand.

The above guide method may be configured so that the identification information is displayed in the form of a mark of a two-dimensional bar code.

This configuration is preferable, because many types of identification information items can be easily handled by two-dimensional bar codes.

The above guide method may be configured so that the service providing place is a shopping mall.

The service providing place may be not only a sole store but also a shopping mall.

According to the present invention, the attribute information of a user as a target (target user) for a service provided at each service providing place is stored in the service information storing means, the first retrieving means retrieves the service information associated with the identification information on the basis of the identification information included in the image data transmitted from the portable terminal, and the second retrieving means selects a service suitable for the user from services provided near the destination service providing place, whereby the service information offering the service suitable for the user near the destination service providing place can be provided for the user, which is convenient.

According to the present invention, the image data transmitted from the portable terminal is analyzed to acquire the identification information included in the image data and the service information is retrieved based on the identification information, whereby the user can readily obtain the guide information by simply photographing the identification information by the portable terminal and transmitting it.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is an illustration showing an example of data stored in a service information DB.

FIG. 5 is an illustration showing an example of data stored in a user attribute information DB.

FIG. 8 is an illustration showing an example of data stored in an identification information display place DB.

FIG. 9 is a flowchart showing the operation of the guide system according to the embodiment.

DESCRIPTION OF THE PREFERRED EMBODIMENTS

The preferred embodiments of the guide system according to the present invention will be described below in detail with reference to the drawings. The same elements will be denoted by the same reference symbols throughout the description of the drawings, without redundant description.

First Embodiment

Figure 1:
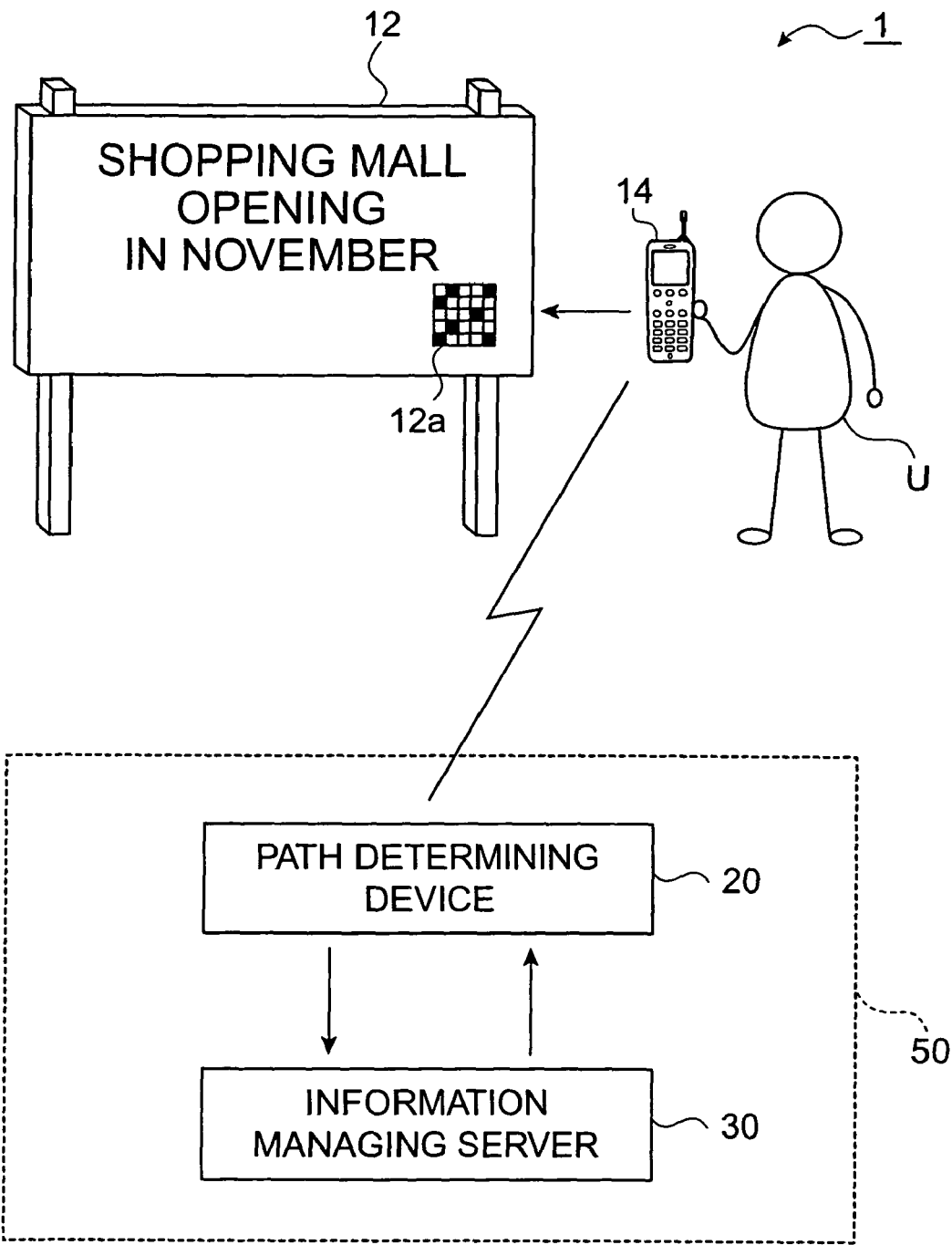
FIG. 1 is an illustration showing a configuration of a guide system according to an embodiment.

FIG. 1 is a block diagram showing a guide system 1 according to an embodiment of the present invention. As shown in FIG. 1, the guide system 1 comprises a guide apparatus 50, a portable terminal 14, and a display 12a of identification information. The identification information is a two-dimensional bar code 12a, and is attached to a signboard 12 displaying an advertisement of a shopping mall opening in November. The portable terminal 14 owned by a user U is a terminal having a photographing device, a communication device, and a location detecting device. The photographing device has the same function as digital cameras, and the communication device can transmit and receive photographed image data or the like. The location detecting device has a function of detecting a location of portable terminal 14 by utilizing GPS. A typical example of portable terminal 14 is a cell phone 14, but may be a device such as a PDA (Personal Digital Assistant). In the present embodiment, the portable terminal 14 is assumed to be a cell phone.

The guide apparatus 50 is comprised of a path determining device 20 and an information managing server 30. Each of them will be described below. In FIG. 1, the path determining device 20 and information managing server 30 are connected in a one-to-one relation, but another potential configuration is such that a plurality of path determining devices 20 are connected to one information managing server 30.

Figure 2:
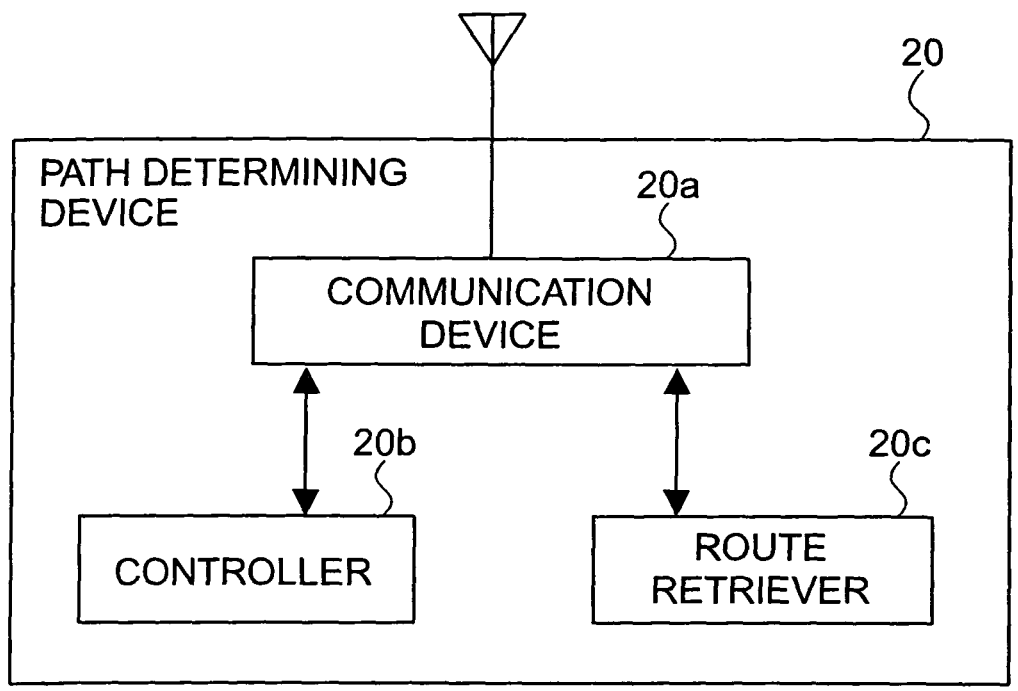
FIG. 2 is an illustration showing a configuration of a path determining device.

FIG. 2 is a block diagram showing a configuration of path determining device 20. As shown in FIG. 2, the path determining device 20 has a communication device 20a, a controller 20b, and a route retrieving device 20c.

The communication device 20a has a function of implementing communication with cell phone 14 and with information managing server 30. The communication with cell phone 14 is implemented by a communication function similar to that of base stations used in the presently known cellar phone systems. The communication with information managing server 30 can be implemented by adopting one of various conventionally known communication techniques. For example, the communication may be implemented by radio or by such a cable as optical fiber or the like.

The controller 20b has a function of, upon receiving image data and location information from cell phone 14 through the communication device 20a, adding an ID of path determining device 20 to the received image data and location information, and returning the information to the communication device 20a.

The route retrieving device 20c has a function of, upon receiving service information from information managing server 30 through the communication device 20a, retrieving a route from the location of cell phone 14 to a service providing place, based on the information of the service providing place included in the received service information and based on the location information transmitted from the cell phone 14. The route retrieving device 20c may be arranged to display the retrieved route by different color on a map or inform the user of a direction of a turn at an intersection or the like by voice, and these can be implemented by applying the conventionally known technologies used in the car navigation apparatus. Namely, the route retrieving device 20c has a function of transmitting map data containing directions, to cell phone 14 and making cell phone 14 display this map data.

Figure 3:
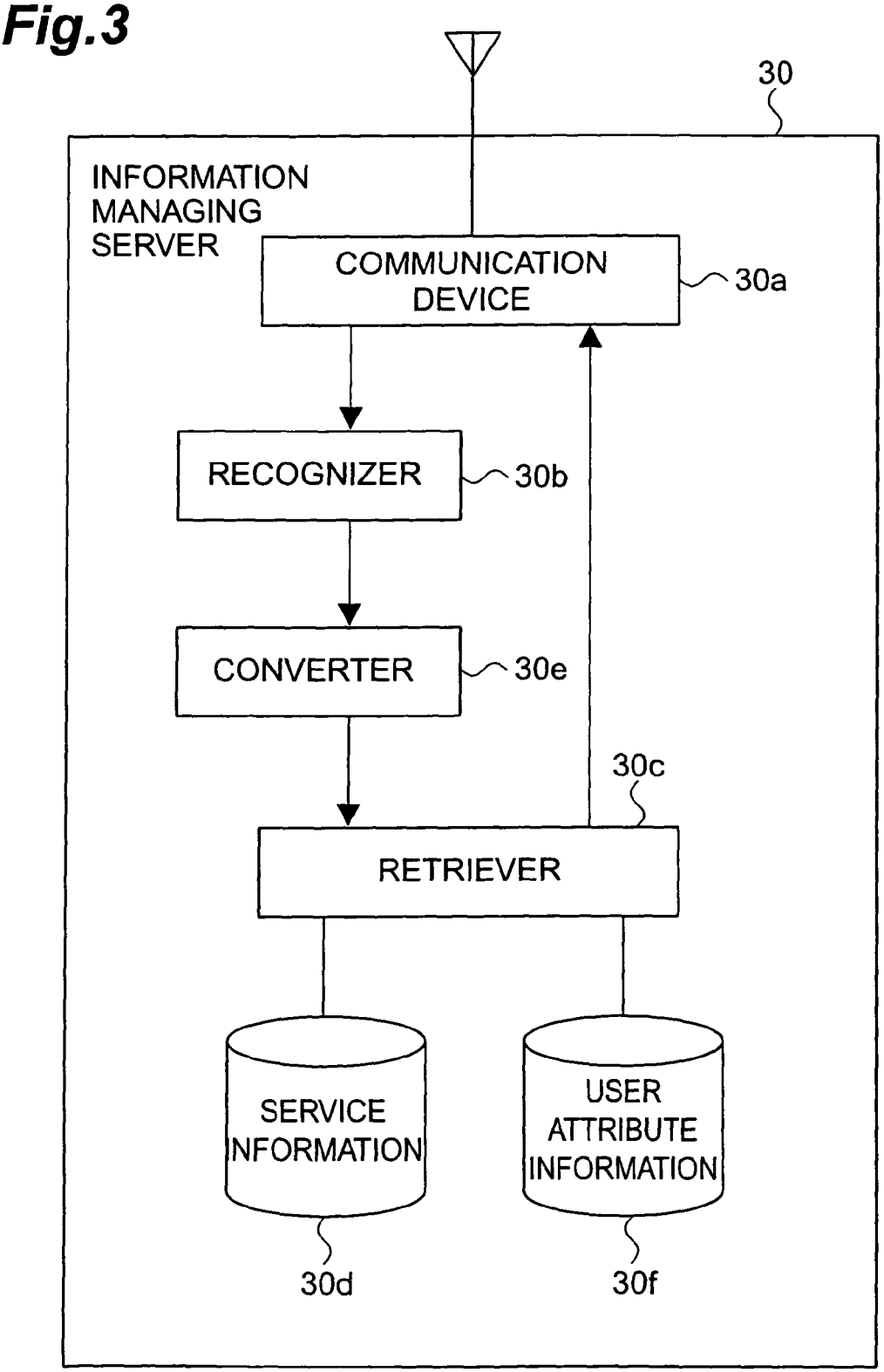
FIG. 3 is an illustration showing a configuration of an information managing server.

The information managing server 30 will be described below. FIG. 3 is a block diagram showing a configuration of information managing server 30. As shown in FIG. 3, the information managing server 30 is provided with a service information storage (hereinafter referred to as "service information DB") 30d, a user attribute information storage (hereinafter referred to as "user attribute information DB") 30f, a communication device 30a, a recognizing device 30b, a converter 30e, and a retrieving device 30c.

The service information DB 30d is a database storing information about services provided. FIG. 4 is a diagram showing an example of data stored in the service information DB 30d. As shown in FIG. 4, the service information DB 30d stores data about items of "global ID," "name," "related information," and "target users." "Global ID" is identification information for identifying service information and is an ID for unitarily handling various IDs commonly used in the world. For example, in the case of books, IDs of ISBNs are commonly used, and a system of IDs called the JAN codes is utilized as bar codes. Since various IDs are utilized in the world as described above, global IDs are defined in the information output system 1 according to the present embodiment, in order to permit unitary handling of various IDs. With the global IDs, we can unitarily handle various articles, e.g., books, vegetables, bags, stores, hotels, airplanes, and so on. "Name" is information about a name of service information specified by a global ID. In the example shown in FIG. 4, there are stored a shop A to provide a service of sales of pets, and a shop B to provide a service of sales and repair of bicycles. "Related information" is information related to a service, including information about a service providing place. For the service information specified by global ID "G1001," there is stored as related information, information about a type of the service and business hours, along with information about a service providing place. "Target users" is attribute information of users U as a target for provision of a service. This information is based on data about attributes of users U interested in the service and about attributes of users U effectively reacting to advertisement.

The user attribute information DB 30f is a database storing information about attribute information of user U. FIG. 5 is a diagram showing an example of data stored in the user attribute information DB 30f. As shown in FIG. 5, the user attribute information DB 30f stores data about items of "cell phone number" and "attribute information." "Cell phone number" is information about a phone number of cell phone 14 owned by user U. This information has a role as identification information to specify a user U. Where the portable terminal is not a cell phone 14, identification information may be assigned to each user U or to the portable terminal owned by user U. "Attribute information" is attribute information of user U of cell phone 14 specified by a cell phone number.

The communication device 30a has a function of performing communication with the path determining device 20. This communication device 30a can adopt one of various conventional communication technologies. For example, the communication may be implemented by radio or by a cable such as optical fiber or the like.

The recognizing device 30b has a function of recognizing image data received by the communication device 30a and acquiring an ID indicated by a two-dimensional bar code 12a included in the image data. This corresponds to the "identification information acquiring means" as set forth in the claims. This recognizing device 30b is a means for recognizing an ID indicated by a two-dimensional bar code 12a from an image of the two-dimensional bar code 12a, and the recognizing device 30b of this type is utilized in the conventional two-dimensional bar code systems and thus can utilize the conventional recognition techniques as they are. Typically, it is preferable to perform the recognition of two-dimensional bar code 12a, using the pattern recognition technology of two-dimensional image.

The converting device 30e has a function of converting an ID recognized by the recognizing device 30b, to a global ID and outputting the global ID to the retrieving device 30c. The converting device 30e has a conversion table referred to in converting a local ID defined for each commercial product, to a global ID. When the communication device 30a receives a global ID itself, the converting device 30e does not carry out the processing.

The retrieving device 30c has a function of searching the service information DB 30d, using a global ID input through the conversion by the converting device 30e, as a key, and extracting service information. In the description hereinafter, service information based on identification information transmitted from cell phone 14 will be referred to as "desired service information." The retrieving device 30c has a function of retrieving service information suitable for attribute information of user U near a service providing place, based on the desired service information. Specifically, it first retrieves service information provided near the service providing place of the desired service information. Then the retrieving device 30c acquires attribute information of user U from the user attribute information DB 30f on the basis of the information of the cell phone number transmitted from the path determining device 20 and, based on the attribute information of user U acquired, retrieves such service information that the attribute information of user U coincides with attribute information of target users, out of the service information retrieved. In the description hereinafter, the service information retrieved in this manner will be referred to as "additional service information." The retrieving device 30c feeds the desired service information and additional service information retrieved in this manner, to the communication device 30a and makes the communication device 30a transmit the information to the path determining device 20. In the present embodiment, the retrieving device 30c has the both functions of the "first retrieving means" and the "second retrieving means" as set forth in the claims.

The present embodiment has the advantages described below, thanks to the configuration in which the guide apparatus 50 is comprised of the information managing server 30 and path determining device 20. Namely, the information managing server 30 has a function of totally managing information and a plurality of service information items can be registered for one ID in the service information DB 30d. What service should be provided in practice can be determined by a service providing entity that provides a service in practice. Accordingly, the information managing server 30 itself can also be utilized for other services. In the present embodiment, the path determining device 20 serves as a service providing entity to provide the guide information and, where there is a need for use for other services, the apparatus can be configured to retrieve necessary information from the information managing server 30 and use it. By adopting a configuration in which a plurality of path determining devices 20 are connected to the information managing server 30, it is feasible to prevent intensive access to the information managing server 30. This can increase the efficiency of processing of the guide apparatus 50.

Figure 6:
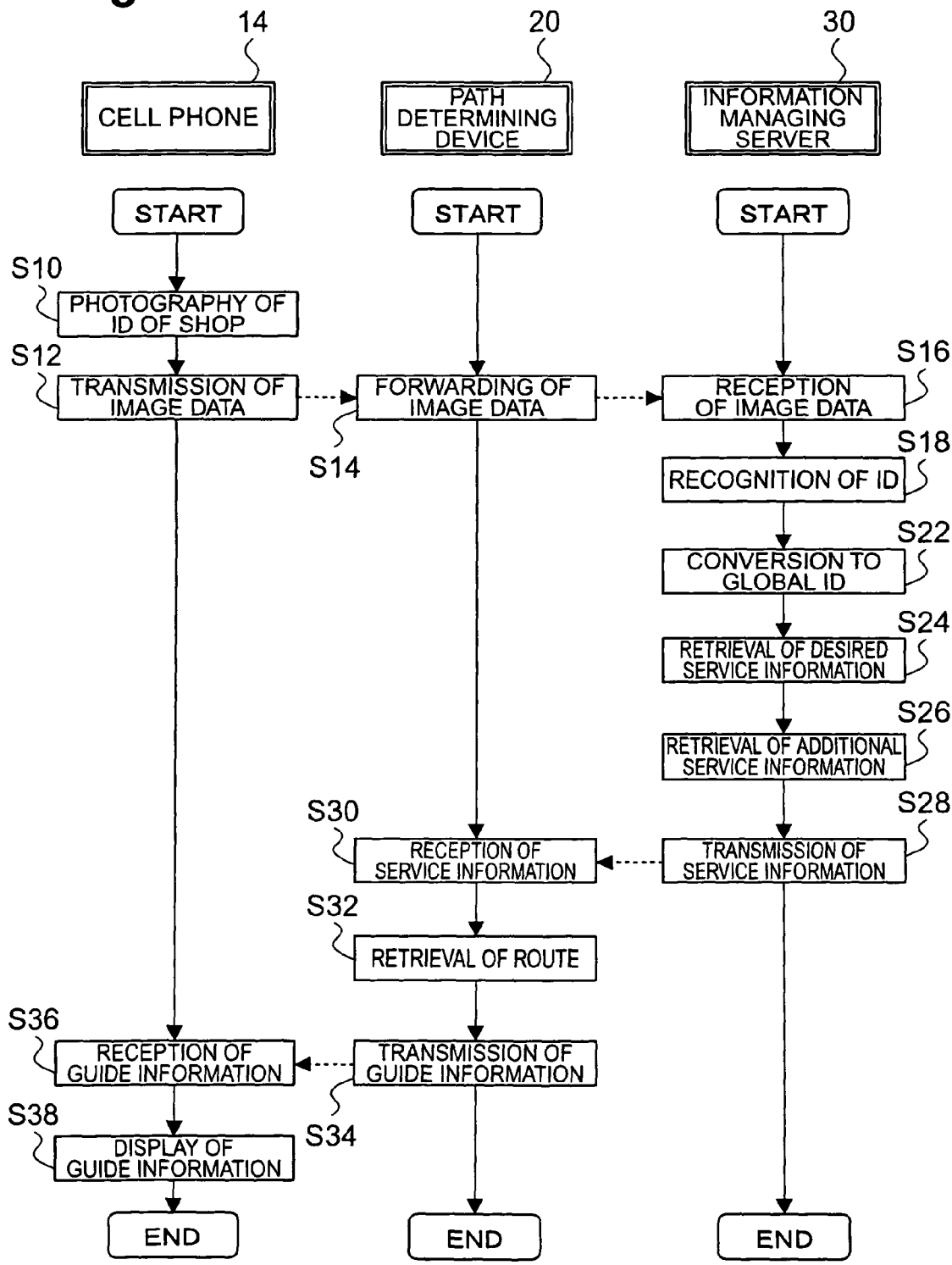
FIG. 6 is a flowchart showing the operation of the guide system according to the embodiment.

The operation of guide system 1 according to the embodiment will be described below with reference to FIG. 6, along with a guide method according to an embodiment of the present invention. FIG. 6 is a flowchart showing the operation of guide system 1.

First, a user U finds a signboard 12 for a desired shopping mall, store, or the like and photographs identification information (two-dimensional bar code) 12a attached to the signboard 12, by means of cell phone 14 (S10). Then the cell phone 14 transmits the photographed image data to the path determining device 20 (S12). On this occasion, the cell phone 14 also transmits the phone number information and location information of the cell phone 14 together to the path determining device 20. The path determining device 20 forwards the image data, phone number information, and location information transmitted from the cell phone 14, to information managing server 30 (S14). More specifically, when detecting reception of the above image data, phone number information, and location information through the communication device 20a, the path determining device 20 makes the controller 20b add an ID of the path determining device 20 to the received image data, phone number information, and location information and forwards the data to the information managing server 30 (S14).

The information managing server 30 receives through the communication device 30a the image data, phone number information, and location information forwarded by the path determining device 20 (S16), and then the received image data is fed into the recognizing device 30b to acquire an ID included in the image data (S18). In this case, the ID included in the image data can be acquired, using the known technology of recognizing the two-dimensional bar code. Subsequently, the recognizing device 30b feeds the acquired ID to the converting device 30e to convert it into a global ID (S22), and the global ID obtained by the conversion is fed into the retrieving device 30c.

Then the retrieving device 30c of the information managing server 30 searches the service information DB 30d, using the input global ID as a key, and extracts the desired service information associated with the global ID (S24). Furthermore, the retrieving device 30c retrieves additional service information provided near the destination and suiting the attribute of user U (S26). Specifically, the retrieving device 30c retrieves service information provided near the service providing place, based on information about the service providing place of the extracted service information. For example, it retrieves service information of a service provided within 1 km from the destination service providing place. Subsequently, from the service information retrieved, it retrieves service information suitable for the user U of the cell phone 14, based on the attribute information of target users and the attribute information of the user U of the cell phone 14. Namely, it searches for and extracts such service information that the attribute information of the user U of cell phone 14 coincides with a target user attribute of service information. Then the information managing server 30 transmits the desired service information retrieved, and the service information provided near it and suiting the user, to the path determining device 20 (S28).

The path determining device 20 receives the service information transmitted from the information managing server 30 (S30) and retrieves a route to the service providing place on the basis of the received service information (S32). Specifically, it determines a route from the location where the cell phone 14 is currently located, to the service providing place, based on the location information of cell phone 14 received along with the image data at step S14, and the information of the service providing place included in the service information. Then the path determining device 20 transmits the determined route and the neighboring service information as guide information to the cell phone 14 (S34). The cell phone 14 receives the guide information transmitted from the path determining device 20 (S36) and the received guide information is displayed on the cell phone 14 (S38). Namely, it displays the route to the destination service providing place specified by the identification information photographed and transmitted, and the additional service information.

In the guide system 1 according to the present embodiment, the user can acquire the information about the route to the service providing place, by merely photographing the two-dimensional bar code 12a to identify the service information (service providing place) displayed on signboard 12 or the like, by cell phone 14 and transmitting it to the path determining device 20.

Since the information managing server 30 has the attribute information of user U of cell phone 14 and is configured to retrieve service information provided near the destination service providing place and matching the attribute of user U of cell phone 14 and transmit the retrieved service information to the cell phone 14, the user U of cell phone 14 can acquire the service information offering services suitable for the attribute thereof (i.e., services suitable for preferences of the user U), which is convenient. Service providers can also advertise their services efficiently.

Second Embodiment

The second embodiment of the present invention will be described next. The guide system according to the second embodiment comprises a guide apparatus 50, a portable terminal 14, and a display of identification information as the guide system 1 in the first embodiment did (cf. FIG. 1). The guide system is also identical in that the guide apparatus 50 is comprised of a path determining device 20 and an information managing server 30. The guide system according to the second embodiment is different from the guide system 1 according to the first embodiment in that the information managing server 30 manages information about the location of display of the identification information.

Figure 7:
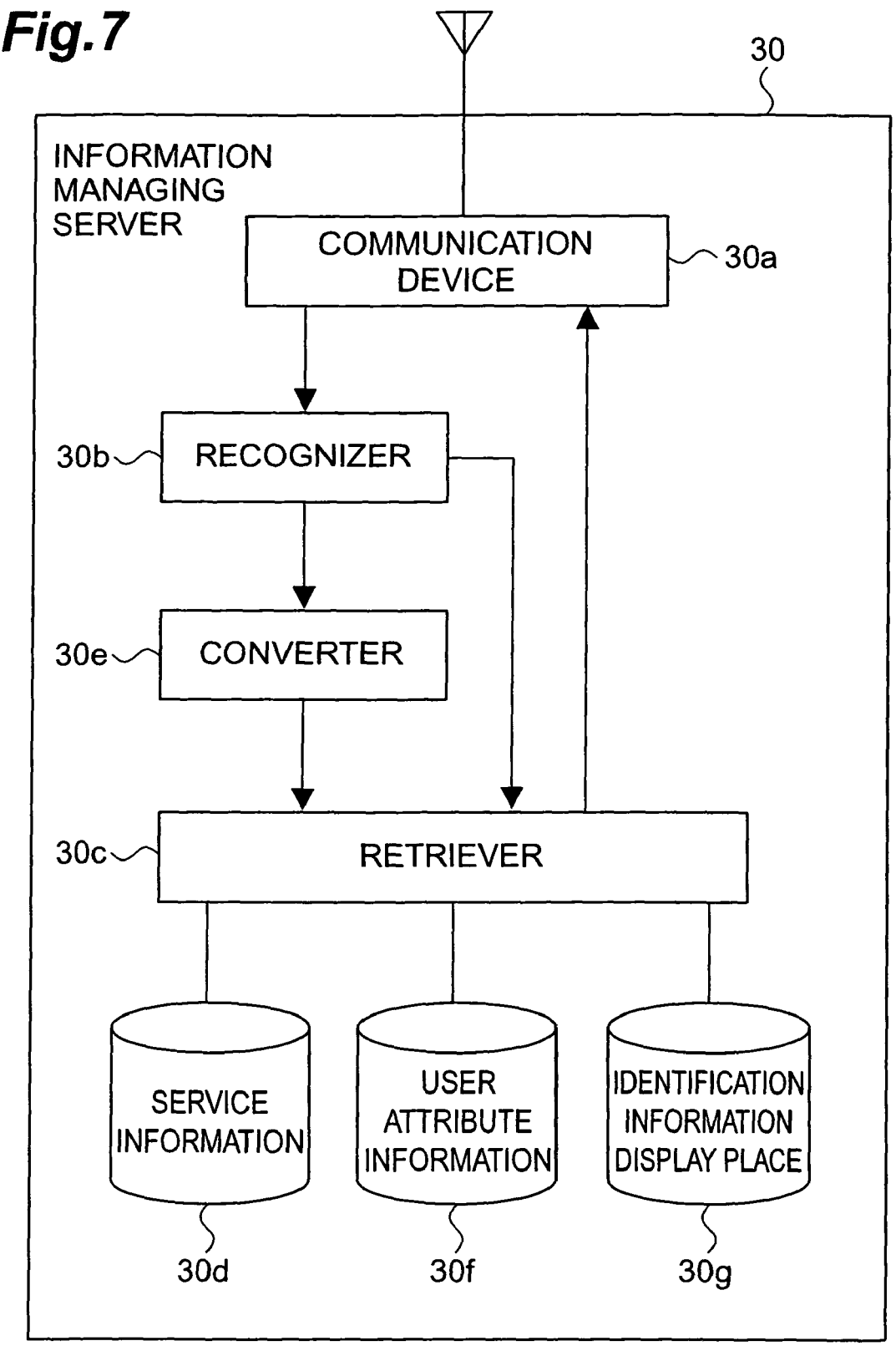
FIG. 7 is an illustration showing a configuration of an information managing server.

The information managing server 30 in the second embodiment will be described with reference to FIG. 7. As shown in FIG. 7, the information managing server 30 in the second embodiment further comprises an identification information display place information storage (hereinafter referred to as "identification information display place DB") 30g storing information about a display place of identification information. Identification information is located at a place different from a service providing place while being attached to a signboard 12 or the like. This identification information display place DB 30g is a database managing locations of respective identification information items. FIG. 8 is a diagram showing an example of data stored in the identification information display place DB 30g. As shown in FIG. 8, the identification information display place DB 30g stores data of items of "identification information" and "display place." "Identification information" is information for specifying service information attached to signboard 12 or the like. In the present embodiment, it is necessary to specify a display place of each identification information even for an identical service and therefore, for example, information of "1001-01" indicates the identification information by its upper four digits and indicates its display place for the same service by the lower two digits. "Display place" is information about a display place of each identification information.

The operation of the guide system according to the second embodiment will be described below with reference to FIG. 9. Since the basic operation is the same as the operation of the guide system 1 according to the first embodiment, it will be described with focus on parts different from the operation of the guide system 1 according to the first embodiment.

First, the user U finds a signboard 12 of a desired shopping mall, store, or the like and photographs the identification information attached to the signboard 12, by cell phone 14 (S10). Then the cell phone 14 transmits the photographed image data to the path determining device 20 (S12). On this occasion, the cell phone 14 transmits the data along with the phone number information of cell phone 14 to the path determining device 20. In the guide system of the second embodiment herein, the cell phone 14 does not transmit the location information thereof. The path determining device 20 forwards the image data and phone number information transmitted from the cell phone 14, to the information managing server 30 (S14).

The information managing server 30 receives the image data and phone number information forwarded by the path determining device 20, through the communication device 20a (S16) and feeds the received image data to the recognizing device 30b to acquire an ID included in the image data (S18). Then the acquired ID is fed into the retrieving device 30c, and the retrieving device 30c searches the identification information display place DB 30g on the basis of the ID to retrieve the location of the two-dimensional bar code 12a indicating the ID (S20). Subsequently, the recognizing device 30b feeds the acquired ID to the converting device 30e to convert it to a global ID (S22), and the global ID obtained through the conversion is fed into the retrieving device 30c.

Then the retrieving device 30c of the information managing server 30 searches the service information DB 30d, using the input global ID as a key (S24), and extracts the service information associated with the global ID. Furthermore, the retrieving device 30c retrieves additional service information provided near the destination and matching the attribute of the user U (S26). Specifically, the retrieving device 30c retrieves service information provided near the service providing place, based on the information about the service providing place of the extracted service information. Then the information managing server 30 transmits the desired service information retrieved, the service information provided near it, and the information about the display place of the ID to the path determining device 20 (S28).

The path determining device 20 receives the service information and the information about the display place of the ID transmitted from the information managing server 30 (S30), and retrieves a route to the service providing place on the basis of the received service information (S32). Namely, the user U is considered to be present at the display place of the identification information, because the user U photographed the identification information by the cell phone 14. Therefore, the route to the service providing place is determined based on the information of the display place of the ID transmitted from the information managing server 30 and the information of the service providing place included in the service information (S32). Then the path determining device 20 transmits the determined route and the neighboring service information as guide information to the cell phone 14 (S34). When the cell phone 14 receives the guide information transmitted from the path determining device 20 (S36), the received guide information is displayed on the cell phone 14 (S38). Namely, it displays the route to the destination service providing place specified by the identification information photographed and transmitted, and the neighboring service information thereof.

With the guide system according to the second embodiment, the user can acquire the information about the route to the service providing place by simply photographing the two-dimensional bar code 12a to identify the service information (service providing place) displayed on signboard 12 or the like, by the cell phone 14 and transmitting it to the path determining device 20, as was the case with the guide system 1 in the first embodiment.

Since the information managing server 30 has the attribute information of user U of cell phone 14 and is configured to retrieve the service information provided near the destination service providing place and matching the attribute of user U of cell phone 14 and transmit the retrieved service information to the cell phone 14, the user U of cell phone 14 can acquire the service information offering services suitable for the user U, which is convenient.

Furthermore, the cell phone 14 does not have to transmit the location information of cell phone 14 to the path determining device 20, whereby the guide system can also be constructed even if the cell phone 14 does not have any location detecting means.

The guide system and guide method of the present invention were described above in detail with the embodiments, but it is noted that the present invention is by no means intended to be limited to the above embodiments.

In the above embodiments, the information managing server 30 has the user attribute information DB 30f storing the attribute information of user U, but the information managing server 30 does not always have the user attribute information DB 30f. Where the information managing server 30 does not have the user attribute information DB 30f, the attribute information of user U of cell phone 14 is transmitted to the path determining device 20 on the occasion of transmitting the image data of the two-dimensional bar code 12a from the cell phone 14, and the additional service information is retrieved using the transmitted attribute information. The retrieval of the additional service information may be carried out by the path determining device 20 or by the information managing server 30. Where the additional service information is retrieved by the information managing server 30, the path determining device 20 forwards the user attribute information transmitted from the cell phone 14, to the information managing server 30. Where the additional service information is retrieved by the path determining device 20, the information managing server 30 retrieves all service information items provided near the destination service providing place and transmits the information items to the path determining device 20, and the path determining device 20 selects service information matching the attribute of the user U on the basis of the user attribute.

In the above embodiments the guide apparatus 50 is comprised of the path determining device 20 and information managing server 30, but the guide apparatus does not always have to be constructed in this separate configuration, and may be constructed as an integral unit.

In the above embodiments the service information DB 30d of the information managing server 30 stores the information in connection with global IDs, but it is not always necessary to use the global IDs. Where local IDs determined by service providing entities are used instead of the global IDs, the converting device 30e is not needed.

The above embodiments described the example in which the two-dimensional bar code 12a (identification information) was attached to the signboard 12, but the two-dimensional bar code 12a may be attached to an advertisement.

The identification information of the service providing place is not limited to the two-dimensional bar code, but may be an ordinary bar code or a so-called RF-ID. The RF-ID provides an article with information of an ID or the like in a contactless manner by electromagnetic wave. Another potential method is to attach a tag containing a compact IC to an article, like a so-called IC tag. The IC can store a predetermined volume of information inside and the information can be read from outside. By using the ID as the information, it can be utilized in the present invention. Where the ordinary bar code is applied, the bar code may be photographed by the photographing device in the cell phone 14, or the bar code may be read by a bar code reader mounted on the cell phone 14. The data containing the identification information of the service providing place may be transmitted and received by infrared communication or by communication using high-frequency waves.

The above embodiments described the example of the shopping mall, but the target object can be any object whose place is definitely determined, without having to be limited to the example. For example, the target object can be a sole store, an amusement park, a park, or the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A guide apparatus for transmitting guide information to a portable terminal for guiding a user of the portable terminal to a store the guide apparatus comprising:

means for storing service information about a store providing a service and expected attribute information of an expected user for the service;

means for receiving image data containing identification information to identify a first store, the image data being captured by and transmitted from the portable terminal;

means for acquiring the identification information of the first store by analyzing the image data included in the data received by the means for receiving from the portable terminal to acquire the identification information of the first store included in the image data;

means for retrieving first service information from the means for storing, based on the identification information acquired by the means for acquiring identification information;

means for retrieving a plurality of second service information of a plurality of services provided at a second store located within a distance of a predetermined threshold from the first store, based on location information about the first store included in the first service information and location information about the second store included in the second service information;

means for comparing attribute information of the user of the portable terminal with expected attribute information of an expected user of each of the plurality of the services provided at the second store, and for determining which services of the plurality of the services to offer to the user based on whether the attribute information of the user of the portable terminal matches the expected attribute information;

means for selecting, from the plurality of second service information selected service information corresponding to the services determined to be offered to the user of the portable terminal by the means for comparing and determining;

means for retrieving a route between the portable terminal and the first store, based on the first service information about the store included in the service information retrieved by the means for retrieving first service information; and means for transmitting to the portable terminal, information about the route retrieved by the means for retrieving the route and the selected service information retrieved by the means for selecting, as guide information about the services determined to be offered to the user of the portable terminal.

2. The guide apparatus according to claim 1, wherein the means for receiving further receives information about a location of the portable terminal, and wherein the means for retrieving the route retrieves the route on the basis of the location information of the portable terminal received by the means for receiving and the information about the first store.

3. The guide apparatus according to claim 1, further comprising means for storing information about a display location of the identification information, wherein the means for retrieving the route acquires the information about the display location of the identification information from the means for storing information about the display location on the basis of the identification information acquired by the means for acquiring identification information, and retrieves the route on the basis of the display location of the acquired identification information and the information about the first store.

4. The guide apparatus according to claim 1, wherein the means for receiving further receives the attribute information of the user of the portable terminal, and based on the attribute information of the user received by the means for receiving, the means for retrieving the plurality of second service information retrieves such service information that the attribute information of the user matches the expected attribute information of the expected user for a service of the plurality of services.

5. The guide apparatus according to claim 1, further comprising:

means for storing the attribute information of the user of the portable terminal, wherein the means for receiving further receives identification information of the portable terminal, and the means for retrieving the plurality of second service information retrieves the attribute information of the user of the portable terminal from the means for storing the attribute information of the user of the portable terminal, based on the identification information of the portable terminal received by the means for receiving, and retrieves such service information that the attribute information of the user matches the expected attribute information of the expected user for a service of the plurality of services, based on the retrieved attribute information.

6. The guide apparatus according to claim 1, further comprising:

means for converting the identification information acquired by the means for acquiring identification information, to global identification information, wherein the means for storing stores the service information in connection with global identification information unitarily assigned to service groups of different types, and the means for retrieving first service information retrieves the first service information from the means for storing, using the global identification information obtained through the conversion by the means for converting.

7. The guide apparatus according to claim 1, further comprising:

a path determining device having the means for receiving, the means for retrieving the route, and the means for transmitting; and an information managing device having the means for storing, the means for retrieving first service information, and the means for retrieving the plurality of second service information, wherein each of the path determining device and the information managing device comprises means for transmitting and receiving data which was transmitted from the portable terminal and which the path determining device received by the means for receiving, and service information which the information managing device retrieved from the means for storing.

8. The guide apparatus according to claim 1, wherein the guide information transmitted by the means for transmitting is map information.

9. The guide apparatus according to claim 1, wherein the identification information is displayed in the form of a mark of a two-dimensional bar code.

10. The guide apparatus according to claim 1, wherein the first store includes more than one store or a shopping mall.

11. A guide system comprising the guide apparatus as set forth in claim 1, a portable terminal wirelessly communicable with the guide apparatus, and a display of identification information of the second store located at a place different from the first store, wherein the portable terminal comprises: means for photographing the display of the identification information, means for transmitting image data obtained through photography by the means for photographing, to the guide apparatus and for receiving guide information transmitted from the guide apparatus, and means for displaying the guide information received by the means for transmitting image data and receiving guide information.

12. A guide method in a guide system including a guide apparatus having means for storing service information comprising information about a store providing a service and expected attribute information of an expected user for the service, a portable terminal wirelessly connected to the guide apparatus, and a display of identification information of the store located at a place different from the store, the guide method being adapted to transmit to the portable terminal guide information for guiding a user of the portable terminal to the store, the guide method comprising:

photographing the display of the identification information by the portable terminal;

transmitting image data obtained through photographing the display to the guide apparatus from the portable terminal;
  wherein the guide apparatus transmits information about a route retrieved and a selected service information as guide information from the guide apparatus to the portable terminal;
analyzing the image data received from the portable terminal in the transmitting image data;
acquiring the identification information of a first store included in the image data by analyzing the image data to acquire the identification of the first store included in the image data;
retrieving first service information from the means for storing, based on the identification information acquired in the acquiring step;
retrieving a plurality of second service information of a plurality of services provided at a second store located within a distance of a predetermined threshold from the first store, based on location information about the first store included in the first service information and location information about the second store included in the second service information;
comparing attribute information of the user of the portable terminal with expected attribute information of an expected user of each of the plurality of the services provided at the second store;
determining which services of the plurality of services to offer to the user of the portable terminal based on whether the attribute information of the user of the portable terminal matches the expected attribute information of the expected user;
selecting from the retrieved plurality of second service information selected service information wherein the selected service information corresponds to the services determined to be offered to the user of the portable terminal;
retrieving the route between the portable terminal and the first store, based on the information about the first store included in the first service information;
receiving of the guide information by the portable terminal.

13. A guide apparatus for transmitting guide information to a user of a portable terminal, the guide information guiding the user of the portable terminal to a store, the guide apparatus comprising:
  a service information memory storing service information including information about a store providing a service and expected attribute information of an expected user for said service;
  a receiver receiving image data containing identification information to identify a first store, the image data being captured by and transmitted from the portable terminal;
  an identification information acquiring unit configured to acquire the identification information of the first store by analyzing the image data included in the data received by the receiver from the portable terminal to acquire the identification information of the first store included in the image data;
  a first retriever configured to retrieve first service information from the service information memory, based on the identification information acquired by the identification information acquiring unit;
  a second retriever configured to retrieve a plurality of second service information of a plurality of services provided at a second store located within a distance of a predetermined threshold from the first store, based on location information about the first store included in the first service information and location information about the second store included in the second service information;
  a comparing unit configured to compare attribute information of the user of the portable terminal with expected attribute information of an expected user of each of the plurality of the services provided at the second store, and to determine which services of the plurality of the services to offer to the user of the portable terminal based on whether the attribute information of the user of the portable terminal matches the expected attribute information;
  a selector configured to select from the plurality of second service information selected service information corresponding to the services determined to be offered to the user of the portable terminal by the comparing unit;
  a route retriever configured to retrieve a route between the portable terminal and the first store, based on the first service information; and
  a transmitter configured to transmit to the portable terminal information about the route retrieved by the route retriever and the selected service information selected by the selector, as guide information about the services determined to be offered to the user of the portable terminal.

14. The guide apparatus according to claim 1, wherein the means for acquiring the identification information of the first store recognizes a first ID from the received image data and converts the first ID into a second ID, and
  the means for retrieving first service information from the means for storing retrieves the first service information from the means for storing based on the second ID.

15. The method of claim 12, wherein acquiring the identification information of the first store included in the image data includes recognizing a first ID from the received image data and converting the first ID into a second ID, and
  retrieving first service information from the means for storing includes retrieving the first service information from the means for storing based on the second ID.

16. The guide apparatus according to claim 13, wherein the identification information acquiring unit is configured to recognize a first ID from the received image data and convert the first ID into a second ID, and
  the first retriever is configured to retrieve the first service information from the service information memory based on the second ID.

* * * * *